(12) United States Patent
Tseng

(10) Patent No.: US 12,504,585 B2
(45) Date of Patent: Dec. 23, 2025

(54) LATCH STRUCTURE AND OPTICAL RECEPTACLE THEREOF

(71) Applicant: Chung-Ming Tseng, Myau-Li County (TW)

(72) Inventor: Chung-Ming Tseng, Myau-Li County (TW)

(73) Assignee: ACSUPER TECHNOLOGIES INC., Myau-Li County (TW)

( * ) Notice: Subject to any disclaimer, the term of this patent is extended or adjusted under 35 U.S.C. 154(b) by 347 days.

(21) Appl. No.: 17/128,010

(22) Filed: Dec. 19, 2020

(65) Prior Publication Data

US 2021/0263240 A1    Aug. 26, 2021

Related U.S. Application Data

(60) Provisional application No. 62/981,536, filed on Feb. 26, 2020.

(51) Int. Cl.
*G02B 6/36* (2006.01)
*G02B 6/38* (2006.01)

(52) U.S. Cl.
CPC ......... *G02B 6/3825* (2013.01); *G02B 6/3887* (2013.01); *G02B 6/3893* (2013.01); *G02B 6/3897* (2013.01)

(58) Field of Classification Search
CPC .. G02B 6/3893; G02B 6/3825; G02B 6/3887; G02B 6/3897; G02B 6/3874; G02B 6/3878; G02B 6/36
See application file for complete search history.

(56) References Cited

U.S. PATENT DOCUMENTS

| | | | | |
|---|---|---|---|---|
| 2016/0313512 A1* | 10/2016 | Liu | | G02B 6/3825 |
| 2019/0243072 A1* | 8/2019 | Takano | | G02B 6/403 |
| 2019/0377139 A1* | 12/2019 | Chang | | G02B 6/3898 |

* cited by examiner

*Primary Examiner* — Jennifer Doan

(57) ABSTRACT

The present invention provides a latch structure disposed in an optical receptacle having a first assembly structure. The latch structure comprises a supporting element having a first side and a second side, a first clip structure, and a second assembly structure. The first clip structure is extended toward the first side from end portions of the supporting element. The second assembly structure is formed on the supporting element. When the latch structure is disposed in the optical receptacle, the second assembly structure is assembled with the first assembly structure so as to form a first coupling structure. Alternatively, in another embodiment, the present invention also provides an optical receptacle having the latch structure arranged therein for electrically connecting to the optical connector, which is inserted into the optical receptacle.

17 Claims, 9 Drawing Sheets

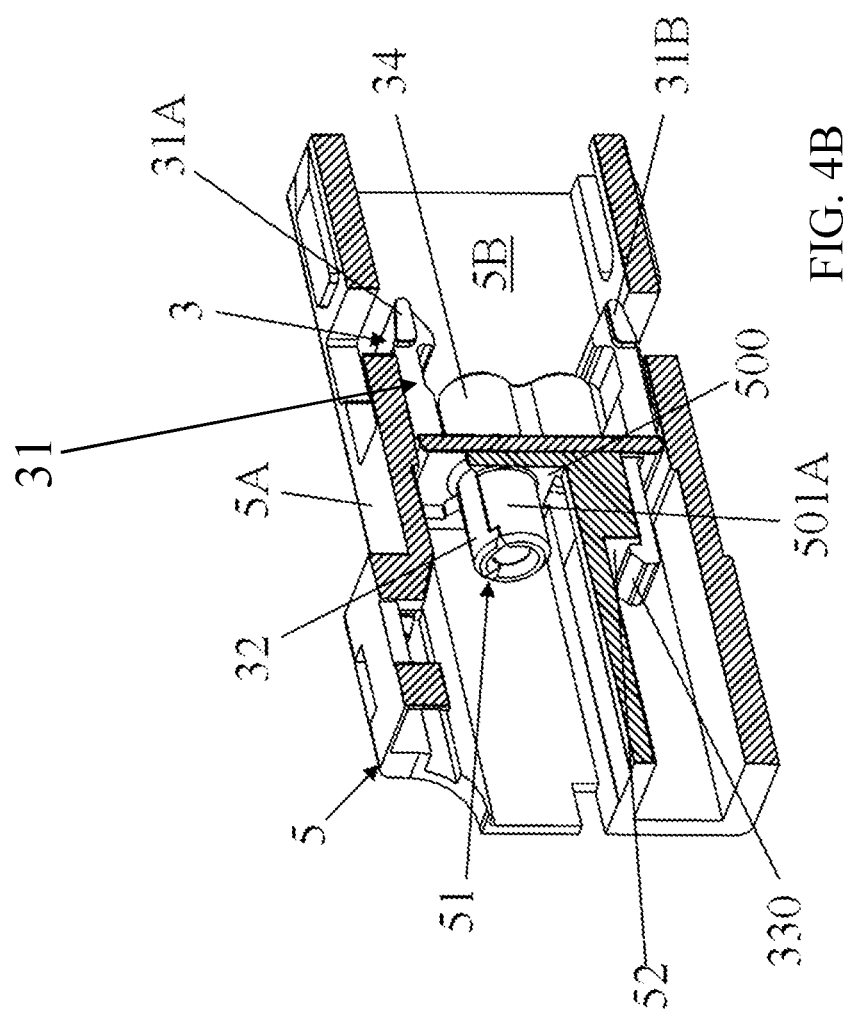
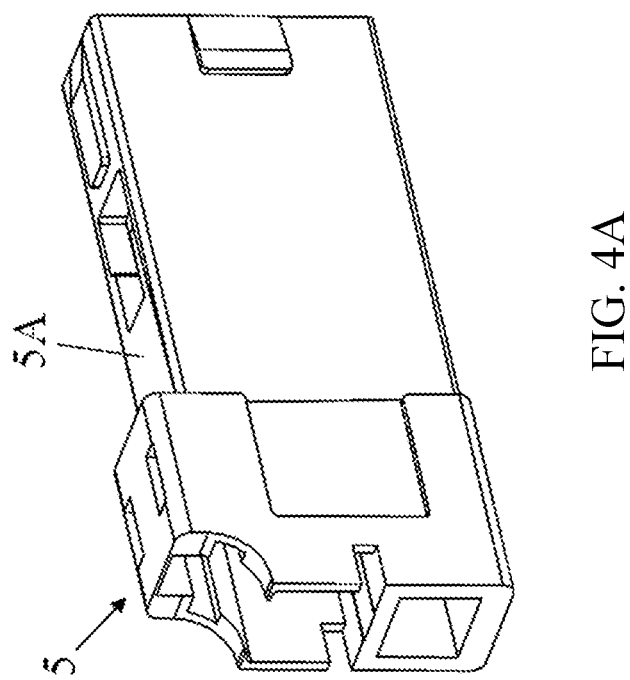
FIG. 4B
FIG. 4A

LATCH STRUCTURE AND OPTICAL RECEPTACLE THEREOF

CROSS-REFERENCE TO RELATED APPLICATION

This application claims the benefit under 35 U.S.C. § 119(e) to the U.S. provisional patent application having the Ser. No. 62/981,536 filed on Feb. 26, 2020, the entirety of which is incorporated herein by reference.

FIELD OF INVENTION

The present invention relates to a latch structure. In particular, it relates to a latch structure used for coupling to an optical connector and an optical receptacle thereof.

BACKGROUND OF THE INVENTION

Due to the advantages of high frequency bandwidth and low loss, optical fibers have been widely used as signal transmission media in recent years. The use of optical fiber has already had a major revolutionary impact in the communications industry. Nowadays, 100 G optical module communication is not enough, and the future will be expected to move towards the era of 400 G optical module communications.

In the field of 400 G optical communications, there are also many designs for the packaging design of optical fiber modules, one of which is called Quad Small Form Factor Pluggable-Double Density (QSFF-DD). The specification, with a downward compatible design, has attracted the attention of many large manufacturers, and has launched corresponding specifications of optical communication module products.

The above information disclosed in this section is only for enhancement of understanding of the background of the described technology and therefore it may contain information that does not form the prior art that is already known to a person of ordinary skill in the art.

SUMMARY OF THE INVENTION

The present invention provides a latch structure and an optical receptacle, wherein the latch structure is combined with a first coupling structure in the optical receptacle through a second coupling structure to form a coupling structure that may be coupled to an optical connector, and the effect of fixing the latch structure in the optical receptacle may also be achieved.

The present invention provides a latch structure and an optical receptacle thereof. Through the combination of the second coupling structure on the latch structure and the first coupling structure in the optical connector, the latch structure is installed inside the optical connector, there is no interaction force between the clip structure for clipping the optical connector and the housing of the optical connector, so as to prevent the clip structure from being stressed and affecting the effect of clipping the optical connector.

In one embodiment, the present invention provides a latch structure, disposed in an optical receptacle, the optical receptacle having a first assembly structure, comprising: a supporting element, having a first side and a second side; a first clip structure, extended from an end portion of the supporting element toward the first side; and a second assembly structure, disposed on the supporting element, and disposed in the optical receptacle to combine with the first assembly structure to form a first coupling structure.

In another embodiment, the present invention further provides an optical receptacle, comprising: a housing, having an accommodation space, a first assembly structure disposed on a side wall of the housing in the accommodation space; and a latch structure, disposed in the optical receptacle, and configured for combining with the first assembly structure, comprising: a supporting element, having a first side and a second side; a first clip structure, extended from an end portion of the supporting element toward the first side; and a second assembly structure, disposed on the supporting element, and disposed in the optical receptacle to combine with the first assembly structure to form a first coupling structure.

Many of the attendant features and advantages of the present invention will become better understood with reference to the following detailed description considered in connection with the accompanying drawings.

BRIEF DESCRIPTION OF THE DRAWINGS

The detailed structure, operating principle and effects of the present invention will now be described in more details hereinafter with reference to the accompanying drawings that show various embodiments of the present invention as follows.

FIG. 4A is a three-dimensional schematic diagram of another embodiment of the optical receptacle in the present invention.

FIG. 4B is a schematic cross-sectional diagram of another embodiment of the optical receptacle in the present invention.

DETAILED DESCRIPTION OF THE PREFERRED EMBODIMENTS

Figure 1:
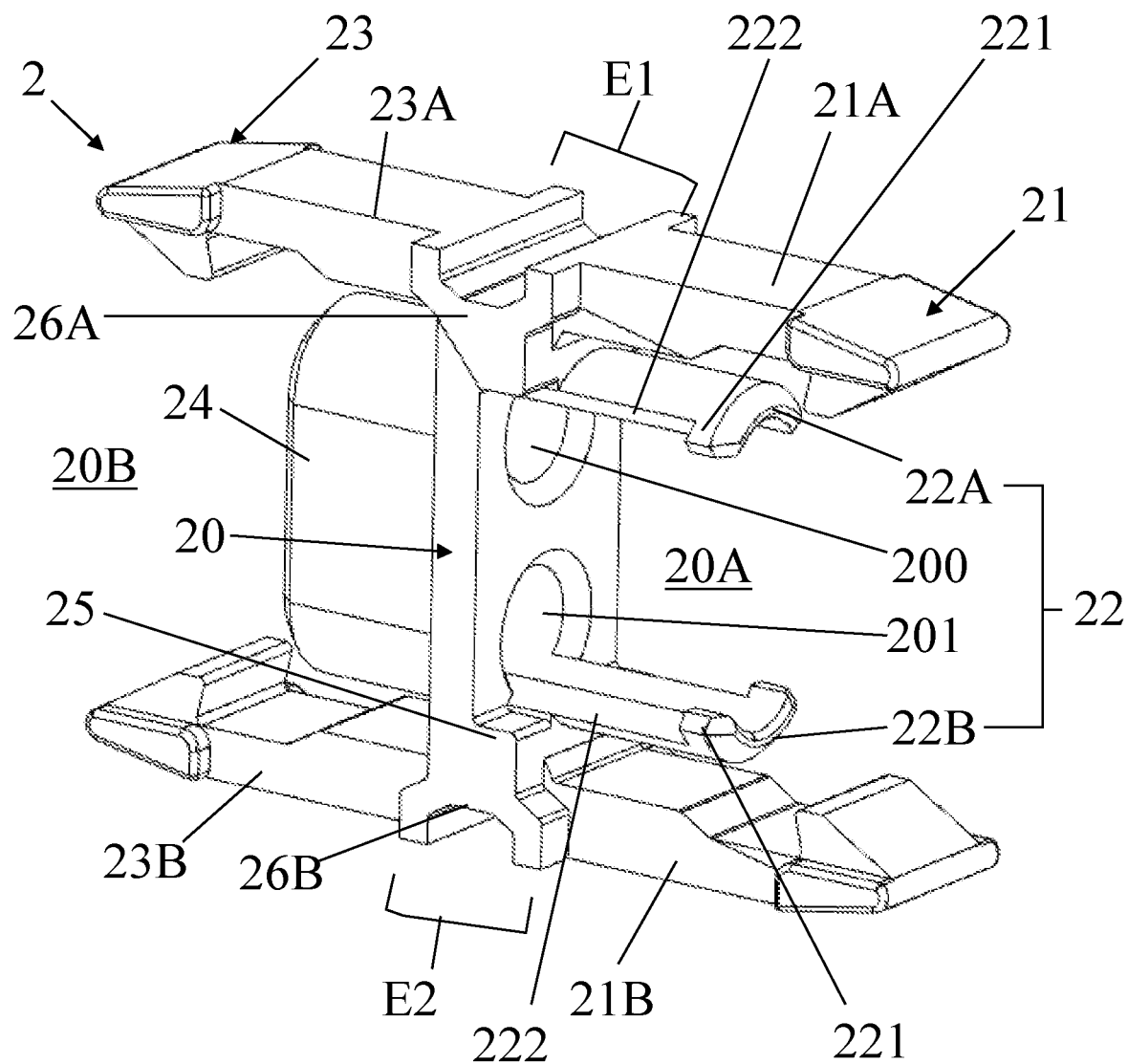
FIG. 1 is a three-dimensional schematic diagram of an embodiment of the latch structure in the present invention.

Reference will now be made in detail to the exemplary embodiments of the present invention, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this invention will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way.

For convenience, certain terms employed in the specification, examples and appended claims are collected here. Unless defined otherwise, all technical and scientific terms used herein have the same meaning as commonly understood by one of the ordinary skill in the art to which this invention belongs.

Various embodiments will now be described more fully with reference to the accompanying drawings, in which illustrative embodiments are shown. The inventive concept, however, may be embodied in various different forms, and should not be construed as being limited only to the illustrated embodiments. Rather, these embodiments are provided as examples, to convey the inventive concept to one skilled in the art. Accordingly, known processes, elements, and techniques are not described with respect to some of the embodiments.

The singular forms "a", "and", and "the" are used herein to include plural referents unless the context clearly dictates otherwise.

The following descriptions are provided to elucidate a latch structure and optical receptacle thereof and to aid it of skilled in the art in practicing this invention. These embodiments are merely exemplary embodiments and in no way to be considered to limit the scope of the invention in any manner.

Please refer to FIG. 1, which is a three-dimensional schematic diagram of an embodiment of the latch structure in the present invention. In this embodiment, the latch structure 2 comprises a supporting element 20, a first clip structure 21, and a second assembly structure 22. In this embodiment, the supporting element 20 has a first side 20A and a second side 20B. In this embodiment, the first clip structure 21 further includes a first fastener 21A and a second fastener 21B respectively located at the two end portions E1 and E2 of the supporting element 20 and extended toward the first side 20A. The second assembly structure 22 is disposed on the supporting element 20. In this embodiment, the supporting element 20 has a first through hole 200 and a second through hole 201. The second assembly structure 22 has a pair of first assembly elements 22A and second assembly elements 22B, which are disposed between the pair of first fasteners 21A and second fasteners 21B, wherein the first assembly element 22A is disposed on one side of the first through hole 200 and corresponds to the first fastener 21A, and the second assembly element 22B is disposed on one side of the second through hole 201 and corresponds to the second fastener 21B. In this embodiment, the second assembly structure 22 extends from the surface of the supporting element 20 toward the first side 20A.

There is a pair of second clip structures 23 on the second side 20B of the supporting element 20. In this embodiment, the second clip structure 23 has a third fastener 23A and a fourth fastener 23B, which are respectively located at two end portions E1 and E2 of the supporting element 20 and extended toward the second side 20B. The second side 20B of the supporting element 20 further has a second coupling structure 24 formed between the third fastener 23A and the fourth fastener 23B. The second coupling structure 24 has a coupling hole (not shown) in communication with the first through hole 200 and the second through hole 201. In this embodiment, the end portion E1 of the supporting element 20 further has a connecting seat 26A between the first fastener 21A and the third fastener 23A and used for connecting the first fastener 21A and the third fastener 23A, and the end portion E2 of the supporting element 20 further has a connecting seat 26B between the second fastener 21B and the fourth fastener 23B and used for connecting the second fastener 21B and the fourth fastener 23B. In addition, a first fixing structure 25 is disposed on the supporting element 20. In this embodiment, the first fixing structure 25 is a trough structure and disposed on the first side 20A of the supporting element 20.

Figure 2:
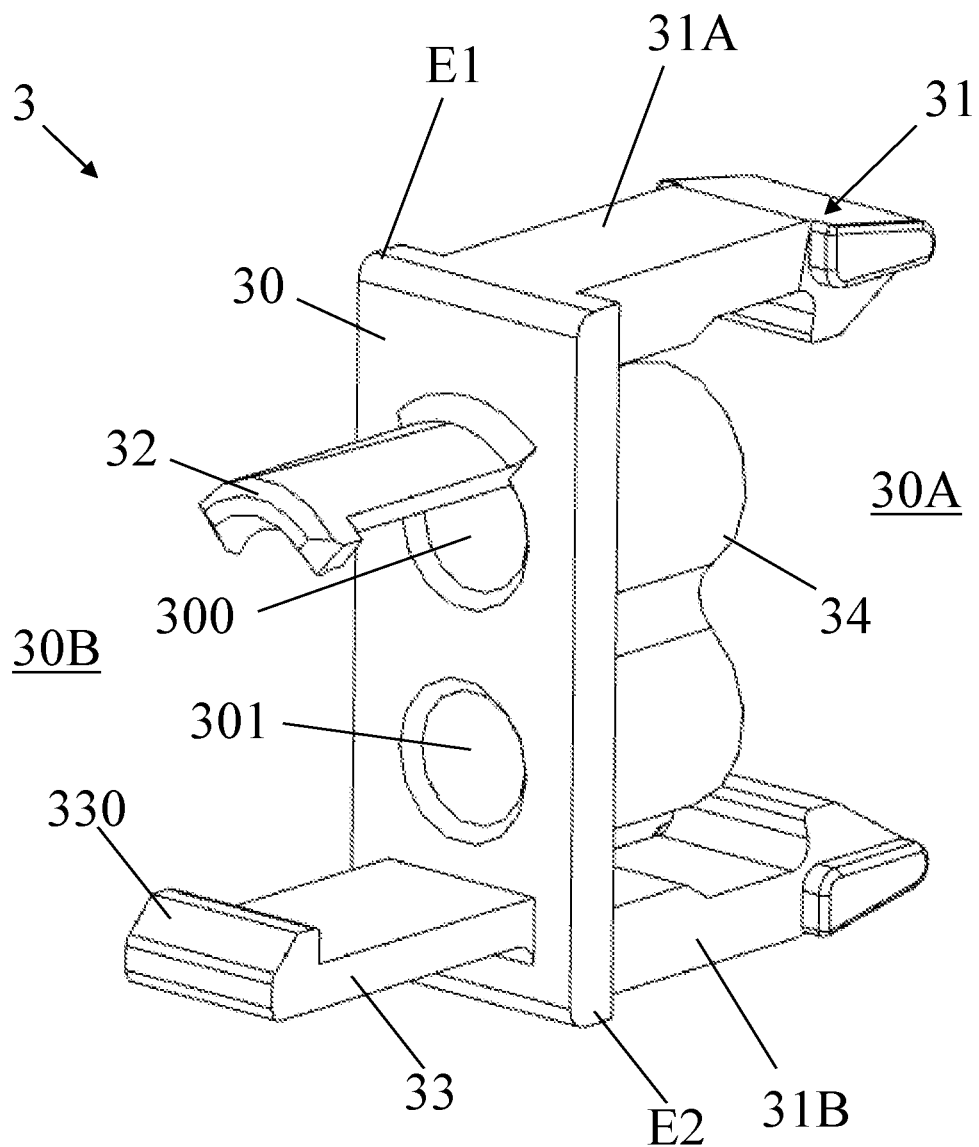
FIG. 2 is a three-dimensional schematic diagram of another embodiment of the latch structure in the present invention.

Please refer to FIG. 2, which is a three-dimensional schematic diagram of another embodiment of the latch structure in the present invention. In this embodiment, the latch structure 3 includes a supporting element 30, a first clip structure 31 and a second assembly structure 32. In this embodiment, the supporting element 30 has a first side 30A and a second side 30B. The first clip structure 31 extends from the end portion E1 of the supporting element 30 toward the first side 30A. In this embodiment, the first clip structure 31 further includes a first fastener 31A and a second fastener 31B respectively located at the two end portions E1 and E2 of the supporting element 30 and extended toward the first side 30A. The second assembly structure 32 is disposed on the supporting element 30. In this embodiment, the second assembly structure 32 extends from the surface of the supporting element 30 toward the second side 20B.

In this embodiment, the supporting element 30 has a first through hole 300 and a second through hole 301. The second assembly structure 32 is disposed on one side of the first through hole 300. At a position where the surface of the supporting element 30 toward the second side 30B is close to the end portion E2, there is a first positioning structure 33 extended from the surface of the supporting element 30 toward the second side 30B. A hook portion 330 is disposed at the end of the first positioning structure 33 to generate fixing and positioning effect. In this embodiment, the supporting element 30 toward the first side 30A further has a second coupling structure 34 formed between the first fastener 31A and the second fastener 31B. The second coupling structure 34 has a coupling hole (not shown) in communication with the first through hole 300 and the second through hole 301.

Figure 3A:
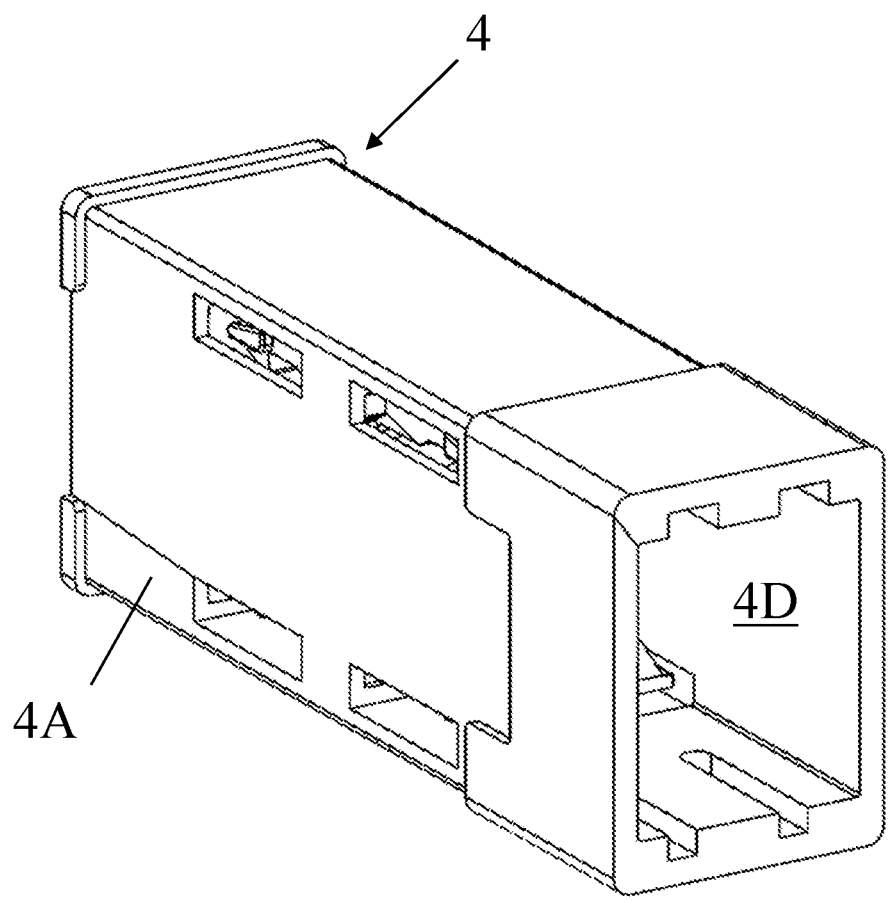
FIG. 3A is a three-dimensional schematic diagram of an embodiment of the optical receptacle in the present invention.
Figure 3B:
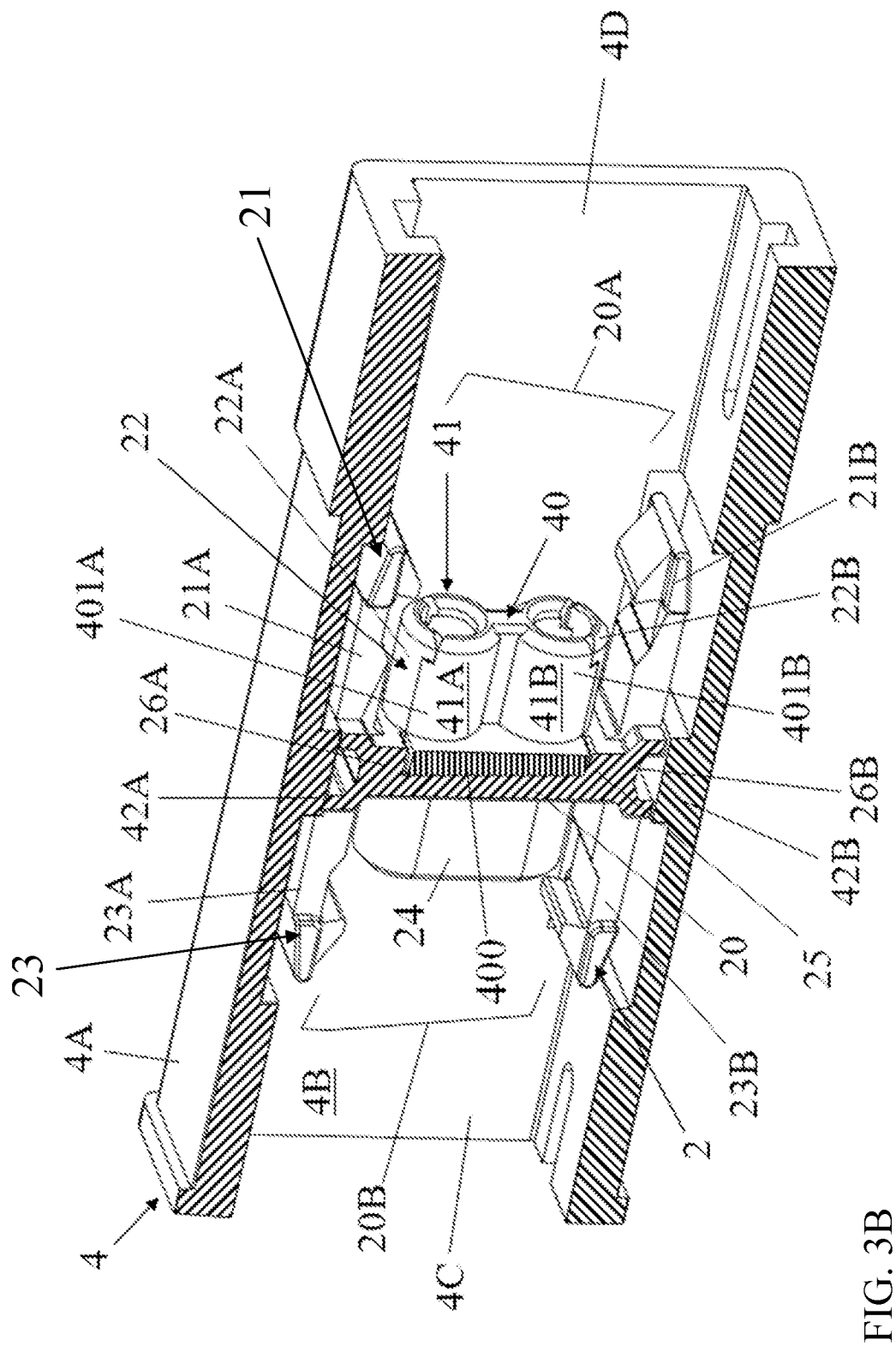
FIG. 3B is a schematic cross-sectional diagram of an embodiment of the optical receptacle in the present invention.
Figure 3C:
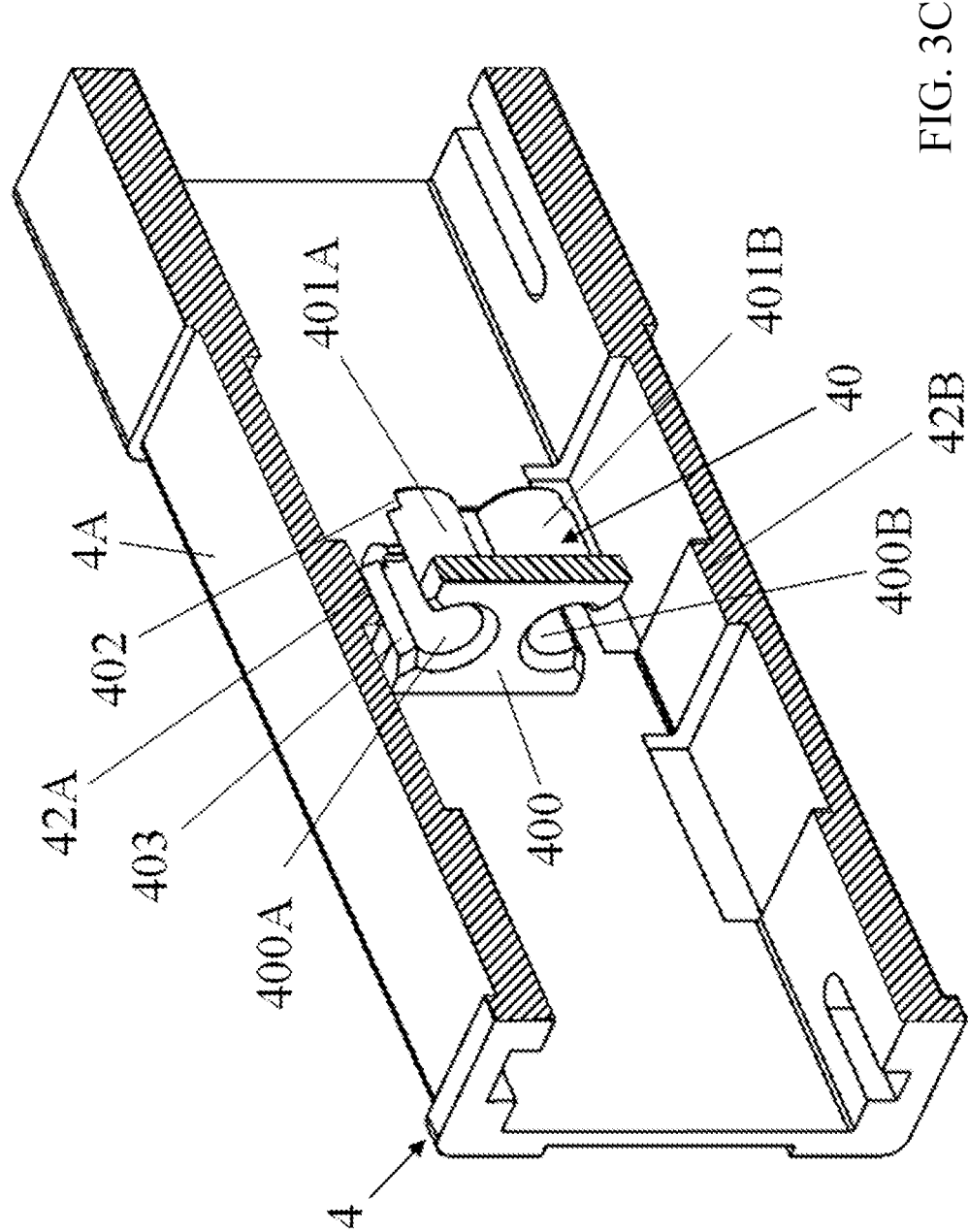
FIG. 3C is a schematic cross-sectional diagram of the housing of the optical receptacle in the present invention.

Please refer to FIGS. 3A to 3C, in which FIG. 3A is a three-dimensional schematic diagram of an embodiment of the optical receptacle in the present invention, FIG. 3B is a schematic cross-sectional diagram of an embodiment of the optical receptacle in the present invention, and FIG. 3C is a schematic cross-sectional diagram of the housing of the optical receptacle in the present invention. The optical receptacle 4 of the present invention is used to be inserted by the optical connector from both sides of the openings 4C and 4D. The first coupling structure 41 in the optical receptacle 4 makes the optical connectors, which are inserted from the openings 4C and 4D, be electrically connected and coupled to each other. In the meanwhile, the first clip structure 21 and second clip structure 23 in the optical receptacle 4 are held by the optical connectors inserted through the openings 4C and 4D.

The optical receptacle 4 includes a housing 4A and a latch structure 2. The housing 4A has an accommodation space 4B, and a first assembly structure 40 is disposed on a side wall of the housing 4A in the accommodation space 4B. In this embodiment, the first assembly structure 40 has a second fixing structure 400, a third coupling element 401A, and a fourth coupling element 401B. The second fixing structure 400 has a first notch 400A and a second notch 400B, and the second fixing structure 400 is combined with the first fixing structure 25. Since the first fixing structure 25 is a trough structure, it can be combined with the second fixing structure 400. In another embodiment, the first fixing structure 25 may also be a convex structure, and the second fixing structure 400 may be a groove structure, which may be determined according to the user's requirements, and is not limited thereto. In addition, it should be noted that the structural design of the first fixing structure 25 and second fixing structure 400 is to allow the latch structure 2 to be installed in the optical receptacle, so as long as the combination can be achieved, it should not be limited in this embodiment. The second fixing structure 400 further has a third assembly element 401A and a fourth assembly element 401B. The third assembly element 401A corresponds to the first notch 400A, and the fourth assembly element 401B corresponds to the second notch 400B.

In this embodiment, the first coupling structure 41 in the optical receptacle 4 is used for coupling with the optical connector. The first coupling structure 41 has a first hollow cylindrical structure 41A and a second hollow cylindrical structure 41B. The third assembly element 401A and the first assembly element 22A are respectively a part of the first hollow cylindrical structure 41A, and the fourth assembly element 401B and the second assembly coupling element 22B are respectively a part of the second hollow cylindrical structure 41B. The third assembly element 401A is combined with the first assembly element 22A to form a first hollow cylindrical structure 41A, and the fourth assembly element 401B is combined with the second assembly element 22B to form a second hollow cylindrical structure 41B. It should be noted that in this embodiment, through the combination of the first assembly element 22A and the third assembly element 401A and the combination of the second assembly element 22B and the fourth assembly element 401B, the latch structure 2 may be firmly fixed into the optical receptacle 4. It should be noted that when the latch structure 2 is installed in the housing 4A, the convex portions 42A and 42B on the inner surface of the housing 4A correspond to the connecting seats 26A and 26B to restrain the latch structure 2 in the housing 4A.

In the combination method of the latch structure 2 and the first assembly structure 40 in this embodiment, as shown in FIGS. 1 and 3B to 3C, both the first assembly element 22A and the second assembly element 22B have the first engaging structure 221 and the second engaging structure 222. The first engaging structure 221 is a pair of convex structures in this embodiment, and the second engaging structure 222 is a rod with curvature. The third assembly element 401A and the fourth assembly element 401B respectively has the third engaging structure 402 and the fourth engaging structure 403, which respectively corresponds to the first engaging structure 221 and the second engaging structure 222, wherein the third engaging structure 402 is a groove structure corresponding to the first engaging structure 221, and the fourth engaging structure 403 is an opening slot structure corresponding to the second engaging structure 222. Therefore, when combined, the first engaging structure 221 and the second engaging structure 222 of the first assembly element 22A are embedded in the third engaging structure 402 and the fourth engaging structure 403 of the third assembly element 401A. Similarly, the first engaging structure 221 and the second engaging structure of the second assembly element 22B are embedded in the third engaging structure 402 and fourth engaging structure 403 of the fourth assembly element 401B. It should be noted that the way to combine the latch structure 2 and the first assembly element 22A is not limited in this embodiment. For example, in another embodiment, there may be only the design of the first assembly element 22A and the third assembly element 401A, but not the design of the second assembly element 22B and the fourth assembly element 401B.

Next, the main design concept of the present invention of FIGS. 1 to 3C is going to be explained. In the embodiment of the present invention, when the latch structure 2 is installed in the optical receptacle 4, the first fastener 21A and the second fastener 21B of the first clip structure 21 as well as the third fastener 23A and the fourth fastener 23B of the second clip structure 23 are not suffered from an interaction force of the housing of the optical receptacle 4, and the method of buckling is achieved through the interaction between the first assembly structure 40 and the second assembly structure 22, and enables the latch structure 2 to be firmly assembled with the first assembly structure 40. When the latch structure 2 is inserted into the optical receptacle 4, this embodiment may prevent the first fastener 21A and the second fastener 21B of the first clip structure 21 as well as the third fastener 23A and the fourth fastener 23B of the second clip structure 23 from squeezing by the internal housing of the optical receptacle 4, which causes stress or deformation, so that the distance between the first fastener 21A and the second fastener 21B as well as the distance between the third fastener 23A and the fourth fastener 23B are not changed, thereby not affecting the clipping and fixing effect of the first fastener 21A and the second fastener 21B for clipping the optical connector inserted from the opening 4C, and also not affect the clipping and fixing effect of the third fastener 23A and the fourth fastener 23B for clipping the optical connector inserted from the opening 4D.

Figure 4C:
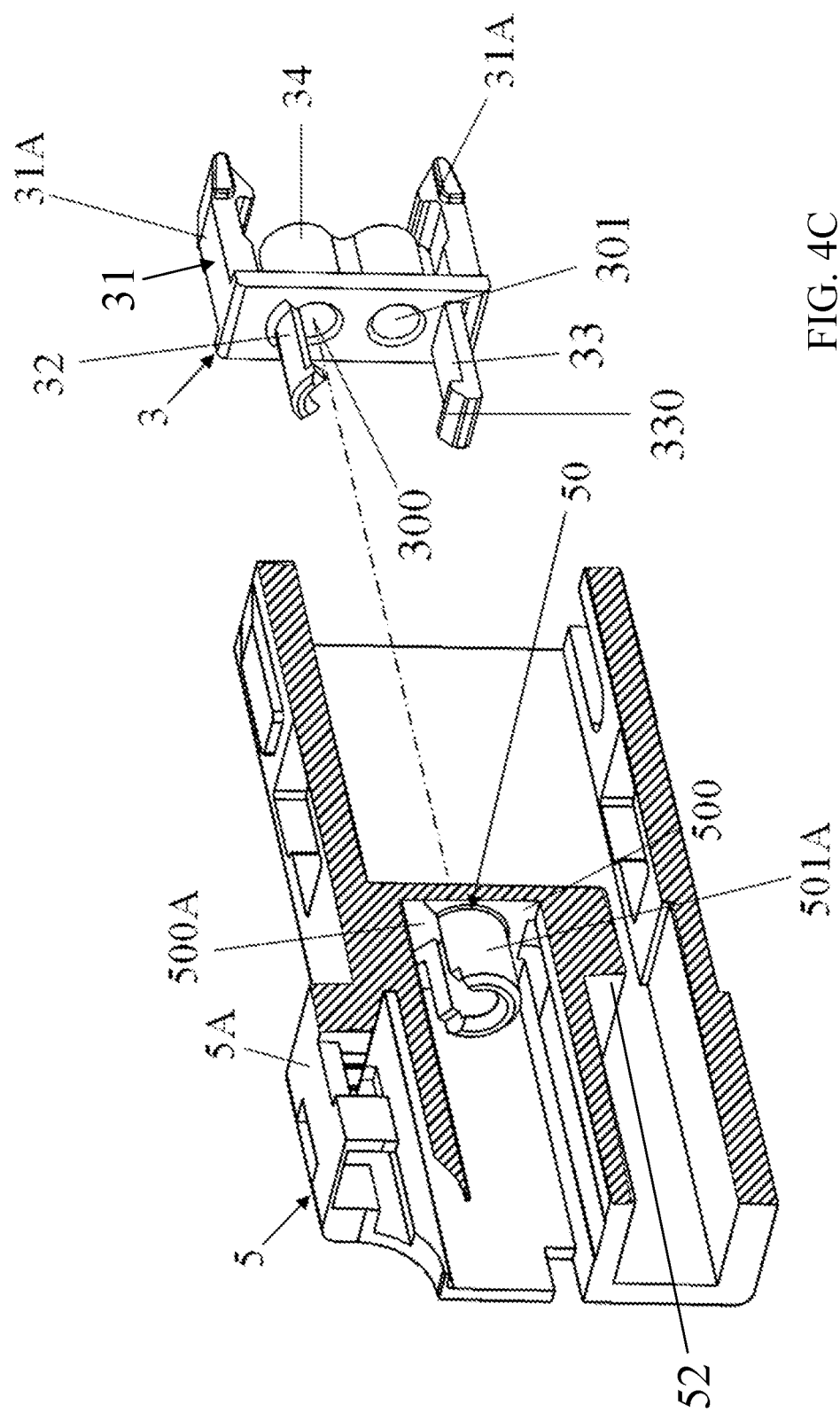
FIG. 4C is an exploded schematic diagram of the housing section and the latch structure of another embodiment in the optical receptacle.

Please refer to FIGS. 4A to 4C, in which FIG. 4A is a three-dimensional schematic diagram of another embodiment of the optical receptacle in the present invention, FIG. 4B is a schematic cross-sectional diagram of another embodiment of the optical receptacle in the present invention, and FIG. 4C is an exploded schematic diagram of the housing section and the latch structure of another embodiment in the optical receptacle. The optical receptacle 5 of this embodiment has a housing 5A and a latch structure 3. The housing 5A has an accommodation space 5B, and a first assembly structure 50 is disposed on one of the side walls of the housing 5A in the accommodation space 5B. In this embodiment, the first assembly structure 50 has a supporting plate 500 and an assembly element 501A. The supporting plate 500 has a first notch 500A, which communicates with a groove inside the assembly element 501A.

The second assembly structure 32 is combined with and the first assembly structure 50, and the hook portion 330 at one end of the first positioning structure 33 is combined with the second positioning structure 52 in the optical receptacle 5, so that the latch structure 3 may be firmly disposed in the optical receptacle 5. In this embodiment, the second assembly structure 32 passes through the first notch 500A and then is combined with the assembly element 501A to form a first coupling structure 51, which is a hollow cylindrical structure and may be coupled to the optical connector. After the latch structure 3 is combined with the first assembly structure 50, the supporting plate 500 is accommodated on the supporting element 30 between the second assembly structure 32 and the first positioning structure 33. It should be noted that the structure of the second assembly structure 32 is similar to the aforementioned first assembly element 22A or second assembly element 22B, and the assembly element 501A is similar to the third assembly element 401A or the fourth assembly element 401B, so that the details are not described herein.

Next, the main design of the invention of FIGS. 4A to 4C is going be explained. In the embodiment of the present invention, when the latch structure 3 is installed in the optical receptacle 5, the first fastener 31A and the second fastener 31B of the first clip structure 31 are not suffered from an interaction force of the inner housing of the optical receptacle 5, and the way of buckling is achieved through the interaction between the first assembly structure 50 and the second assembly structure 32 and between the hook portion 330 and the second positioning structure 52 in the optical receptacle 5, and enables the latch structure 3 to be firmly combined with the first assembly structure 50. When the latch structure 3 is inserted into the optical receptacle 5, this embodiment may prevent the first fastener 31A and the second fastener 31B of the first clip structure 31 from squeezing by the internal housing of the optical receptacle 5, which causes stress or deformation, so that the distance between the first fastener 31A and the second fastener 31B is not changed, thereby not affecting the clipping and fixing effect of the first fastener 31A and the second fastener 31B for clipping the inserted optical connector.

Figure 5A:
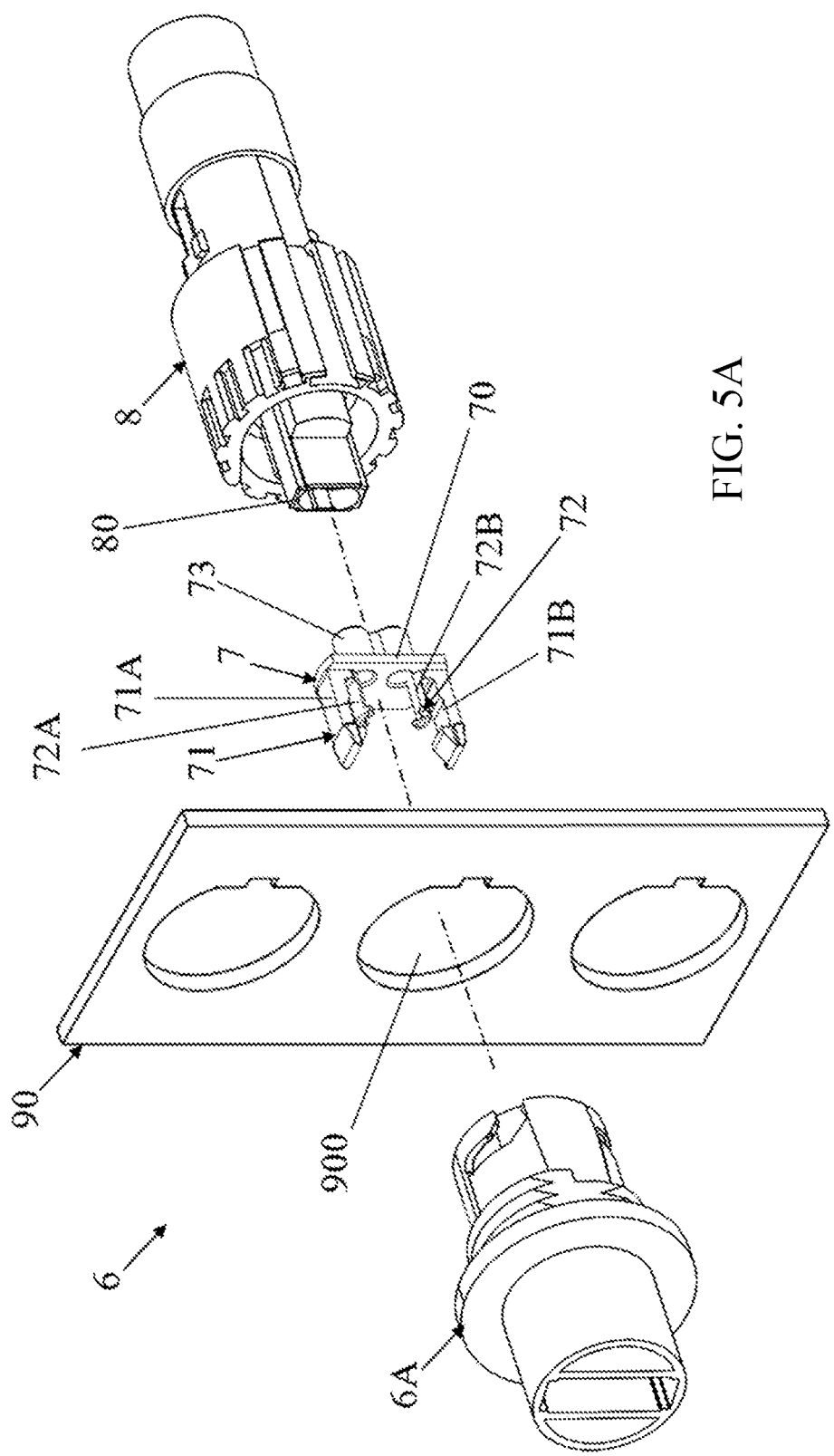
FIG. 5A is a three-dimensional exploded diagram of another embodiment of the optical receptacle and the optical connector in the present invention.
Figure 5B:
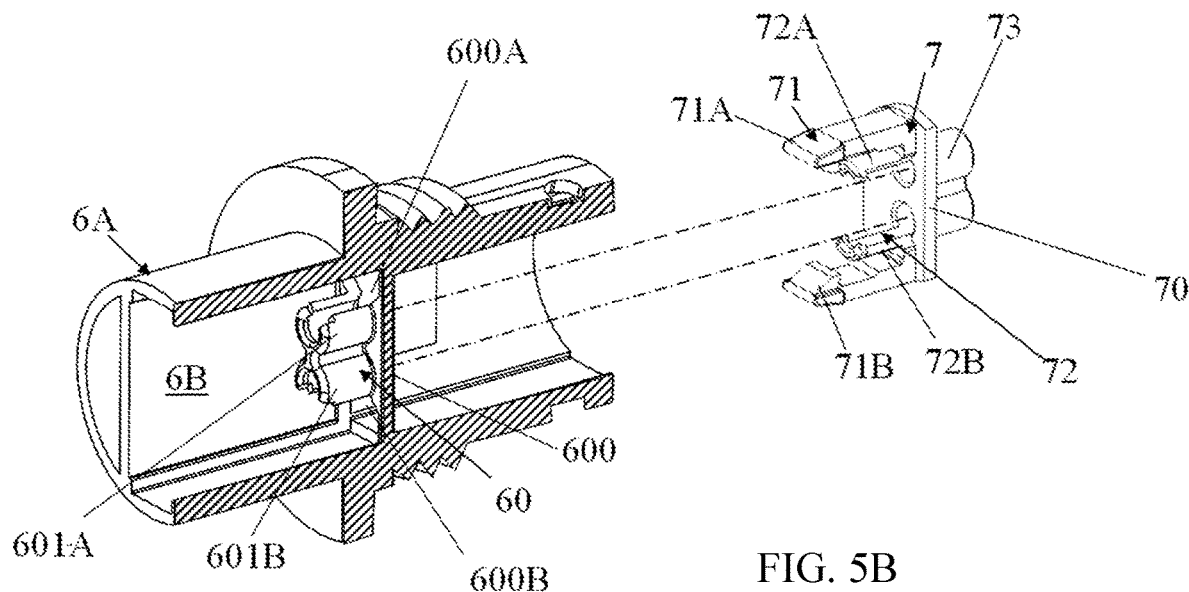
FIG. 5B is a schematic cross-sectional diagram of the optical receptacle shown in FIG. 5A.
Figure 5C:
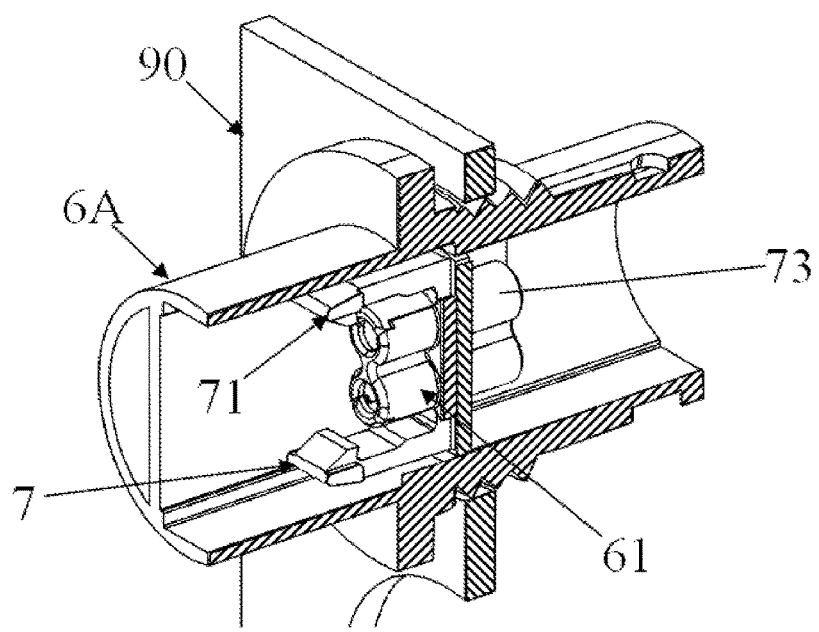
FIG. 5C is an exploded schematic diagram of the housing section and the latch structure of another embodiment of the optical receptacle in the present invention.

Please refer to FIGS. 5A to 5C, in which FIG. 5A is a three-dimensional exploded diagram of another embodiment of the optical receptacle and the optical connector in the present invention, FIG. 5B is a schematic cross-sectional diagram of the optical receptacle shown in FIG. 5A, and FIG. 5C is an exploded schematic diagram of the housing section and the latch structure of another embodiment of the optical receptacle in the present invention. The optical receptacle 6 of this embodiment has a housing 6A and a latch structure 7. The housing 6A has an accommodation space 6B, and a first assembly structure 60 is disposed on one of the side walls of the housing 6A in the accommodation space 6B. In this embodiment, the first assembly structure 60 has a supporting plate 600 and an assembly elements 601A and 601B. The supporting plate 600 has notches 600A and 600B, which communicates with a groove inside the assembly elements 601A and 601B.

The second assembly structure 72 is combined with and the first assembly structure 60, so that the latch structure 7 may be firmly disposed in the optical receptacle 6. In this embodiment, the second assembly structure 72 has a first assembly element 72A and a second assembly element 72B, which respectively passes through the notches 600A and 600B and is respectively combined with the assembly elements 601A and 601B to form a first coupling structure 61, which is a pair of hollow cylindrical structures and may be coupled to the optical connector. After the latch structure 7 is combined with the first assembly structure 60, the supporting plate 600 is leaned against the supporting element 70. It should be noted that the structure of the first assembly element 72A and the second assembly element 72B of the second assembly structure 72 is respectively similar to the aforementioned first assembly element 22A and second assembly element 22B, and the assembly element 601A and 601B are similar to the third assembly element 401A or the fourth assembly element 401B, so that the details are not described herein. The latch structure 7 further has a second coupling structure 73 on another side of the supporting element 70, that is, on the side opposite to the second assembly structure 72, and the second coupling structure 73 is used for coupling with a coupling head 80 of the optical connector 8.

Next, the main design of the invention of FIGS. 5A to 5C is going be explained. In the embodiment of the present invention, when the latch structure 7 is installed in the optical receptacle 6, the first fastener 71A and the second fastener 71B of the first clip structure 71 are not suffered from an interaction force of the inner housing of the optical receptacle 6, and the way of buckling is achieved through the interaction between the first assembly structure 60 and the second assembly structure 72, and enables the latch structure 7 to be firmly combined with the first assembly structure 60. When the latch structure 7 is inserted into the optical receptacle 6, this embodiment may prevent the first fastener 71A and the second fastener 71B of the first clip structure 71 from squeezing by the internal housing of the optical receptacle 6, which causes stress or deformation, so that the distance between the first fastener 71A and the second fastener 71B is not changed, thereby not affecting the clipping and fixing effect of the first fastener 71A and the second fastener 71B for clipping the inserted optical connector.

It will be understood that the above description of embodiments is given by way of example only and that various modifications may be made by those with ordinary skill in the art. The above specification, examples, and data provide a complete description of the present invention and use of exemplary embodiments of the invention. Although various embodiments of the invention have been described above with a certain degree of particularity, or with reference to one or more individual embodiments, those with ordinary skill in the art could make numerous alterations or modifications to the disclosed embodiments without departing from the spirit or scope of this invention.

What is claimed is:

1. A latch structure, disposed in an optical receptacle, the optical receptacle integrally formed with a first assembly structure, comprising:
   a supporting element, having a first side and a second side;
   a pair of first clip structures, extended from two end portions of the supporting element toward the first side; and
   a second assembly structure, disposed between the two end portions of the supporting element, and disposed in the optical receptacle to combine with the first assembly structure to form a first coupling structure, which is arranged on an identical side of the second assembly structure.

2. The latch structure of claim 1, comprising a pair of second clip structures, which is respectively extended from the end portion of the supporting element toward the second side and configured for electrically connecting to an optical connector.

3. The latch structure of claim 2, wherein the second side of the supporting element has a second coupling structure, which is formed between the pair of second clip structures.

4. The latch structure of claim 1, wherein the supporting element has a first fixing structure, which is configured for accommodating the first assembly structure, on the first side.

5. The latch structure of claim 1, wherein the supporting element has a first through hole and a second through hole, the second assembly structure has a first assembly element and a second assembly element, the first assembly element is disposed on a side of the first through hole and corresponds to one of the first clip structure, and the second assembly element is disposed on a side of the second through hole and corresponds to the another first clip structure.

6. The latch structure of claim 1, wherein the first clip structure has a first fastener and a second fastener, which are configured for electrically connecting to an optical connector, and the second assembly structure are disposed between the first fastener and the second fastener.

7. An optical receptacle, comprising:
a housing, having an accommodation space, a first assembly structure integrally formed with a side wall of the housing in the accommodation space; and
a latch structure, disposed in the optical receptacle, and configured for combining with the first assembly structure, comprising:
  a supporting element, having a first side and a second side;
  a pair of first clip structure, extended from two end portions of the supporting element toward the first side; and
  a second assembly structure, disposed between the two end portions of the supporting element, and disposed in the optical receptacle to combine with the first assembly structure to form a first coupling structure, which is arranged on an identical side of the second assembly structure.

8. The optical receptacle of claim 7, comprising a pair of second clip structure, which is respectively extended from the end portion of the supporting element toward the second side.

9. The optical receptacle of claim 8, wherein the second side of the supporting element has a second coupling structure, which is formed between the pair of second clip structures.

10. The optical receptacle of claim 8, wherein connecting seats are disposed between the first clip structure and the second clip structure at an identical end of the supporting element, and configured for connecting the first clip structure and the second clip structure.

11. The optical receptacle of claim 10, wherein the housing has convex portions on the two end portions of the supporting element respectively, and the convex portions correspond to the connecting seats.

12. The optical receptacle of claim 7, wherein the supporting element has a first fixing structure, which is configured for accommodating the first assembly structure, on the first side.

13. The optical receptacle of claim 12, wherein the first assembly structure comprises:
a second fixing structure, having a first notch and a second notch, and configured for combining with the first fixing structure; and
a third assembly element and a fourth assembly element, wherein the third assembly element corresponds to the first notch and the fourth assembly element corresponds to the second notch.

14. The optical receptacle of claim 13, wherein the third assembly element is combined with a first assembly element, and the fourth assembly element is combined with a second assembly element.

15. The optical receptacle of claim 7, wherein the supporting element has a first through hole and a second through hole, the second assembly structure has a first assembly element and a second assembly element, the first assembly element is disposed on a side of the first through hole, and the second assembly element is disposed on a side of the second through hole.

16. The optical receptacle of claim 15, wherein the first coupling structure has a first hollow cylindrical structure and a second hollow cylindrical structure, the first hollow cylindrical structure has the first assembly element and a third assembly element, and the second hollow cylindrical structure has the second assembly element and a fourth assembly element.

17. The optical receptacle of claim 7, wherein the first clip structure has a first fastener and a second fastener, which are configured for electrically connecting to an optical connector, and the second assembly structure are disposed between the first fastener and the second fastener.

* * * * *